United States Patent
Helard et al.

(10) Patent No.: US 9,048,916 B2
(45) Date of Patent: Jun. 2, 2015

(54) METHOD FOR REDUCING CHANNEL LENGTH AND CORRESPONDING FILTER AND SIGNAL

(75) Inventors: Maryline Helard, Rennes (FR); Matthieu Crussiere, Laillé (FR); Karima Ragoubi, Villeurbanne (FR)

(73) Assignees: INTITUT NATIONAL DES SCIENCES APPLIQUEES DE RENNES, Rennes Cedex (FR); CENTRE NATIONAL DE LA RECHERCHE SCIENTIFIQUE, Rennes Cedex (FR)

(*) Notice: Subject to any disclaimer, the term of this patent is extended or adjusted under 35 U.S.C. 154(b) by 81 days.

(21) Appl. No.: 13/576,092

(22) PCT Filed: Dec. 23, 2010

(86) PCT No.: PCT/EP2010/070712
§ 371 (c)(1), (2), (4) Date: Jan. 18, 2013

(87) PCT Pub. No.: WO2011/091928
PCT Pub. Date: Aug. 4, 2011

(65) Prior Publication Data
US 2013/0114770 A1 May 9, 2013

(30) Foreign Application Priority Data
Jan. 29, 2010 (FR) .................................. 10 50656

(51) Int. Cl.
*H04L 27/06* (2006.01)
*H04B 1/10* (2006.01)
(Continued)

(52) U.S. Cl.
CPC .............. *H04B 1/10* (2013.01); *H04L 25/0216* (2013.01); *H04L 25/03019* (2013.01); *H04L 2025/03535* (2013.01); *H04L 2025/0377* (2013.01)

(58) Field of Classification Search
CPC ...... H04L 25/03; H04L 27/26; H04L 25/0216; H04L 25/0319; H04L 2025/0377; H04L 2025/03535; H04B 15/00; H04B 1/10
USPC ......... 375/130, 232, 233, 295, 316, 340, 343, 375/350, 357
See application file for complete search history.

(56) References Cited

U.S. PATENT DOCUMENTS

| | | | |
|---|---|---|---|
| 2001/0007580 A1* | 7/2001 | Heinrich et al. | 375/295 |
| 2003/0112860 A1* | 6/2003 | Erdogan | 375/229 |

(Continued)

FOREIGN PATENT DOCUMENTS

| | | |
|---|---|---|
| EP | 0820168 A2 | 1/1998 |
| WO | 2007149297 A1 | 12/2007 |

OTHER PUBLICATIONS

French Search Report and Written Opinion dated Oct. 29, 2010 for corresponding French Patent Application No. 10/50656, filed on Jan. 29, 2010.
(Continued)

*Primary Examiner* — Syed Haider
(74) *Attorney, Agent, or Firm* — David D. Brush; Westman, Champlin & Koehler, P.A.

(57) ABSTRACT

A method and apparatus are provided for reducing a channel length. The method implements a channel-length reduction filter that takes into account a pulse response of the channel. The method includes the following steps: cutting the filter into at least one first and one second portion; optimizing said first portion of the filter according to a first criterion in order to output a first set of filtering coefficients; reducing the length of the channel by optimizing said second portion of the filter according to a second criterion different from the first one and based on the first set of filtering coefficients of said first portion of the filter in order to output a second set of filtering coefficients.

10 Claims, 5 Drawing Sheets

(51) Int. Cl.
  *H04L 25/02* (2006.01)
  *H04L 25/03* (2006.01)

(56) References Cited

U.S. PATENT DOCUMENTS

2005/0053127 A1* 3/2005 Shiue et al. .................. 375/232
2005/0190871 A1* 9/2005 Sedarat ......................... 375/350
2007/0297499 A1* 12/2007 de Victoria ................... 375/232

OTHER PUBLICATIONS

International Search Report dated Jun. 17, 2011 for corresponding International Application No. PCT/EP2010/070712, filed Dec. 23, 2010.
International Preliminary Report on Patentability and English translation of the Written Opinion dated Aug. 7, 2012 for corresponding International Application No. PCT/EP2010/070712, filed Dec. 23, 2010.
Peter J W Melsa et al., "Impulse Response Shortening for Discrete Multitone Transceivers", IEEE Transactions on Communications, IEEE Service Center, Piscataway, NJ, US, vol. 44, No. 12, Dec. 1, 1996, XP011008850.
Yen-Liang Chen et al., "Cost-Effective Echo and NEXT Canceller Designs for 10GBASE-T Ethernet System", Circuits and Systems, 2008, ISCAS 2008. IEEE International Symposium ON, IEEE, Piscataway, NJ, USA LNKD-DOI:10.1109/ISCAS. 2008. 4542126, May 18, 2008, pp. 3150-3153, XP031392681.
R. K. Martin et al., "Efficient Channel Shortening Equalizer Design" Eurasip Journal on Applied Signal Processing. Hindawi Publishing Corporation, 2003:13, pp. 1279-1290.
R. Schur et al., Reduction of Guard Interval by Impulse Compression for DMT Modulation on Twisted Pair Cables, Global Telecommunication Conference GLOBECOM 2000 vol. 3, pp. 1632-1636.
S. I. Husain et al., "Impulse Response Shortening Through Limited Time Reversed Channel in MB OFDM UWB Systems", ISCIT 2007, pp. 1269-1273, Oct. 2007.
R. K. Martin et al., "Implementation Complexity and Communication Performance Tradeoffs in Discrete Multitone Modulation Equalizers" IEEE Trans. Signal Process, vol. 43, No. 9, pp. 535-537, Apr. 2007.
D. D. Falconer et al.: "Adaptive Channel Memory Truncation for Maximum Likelihood Sequence Estimation", The Bell System Technical Journal, US, vol. 52, No. 9, Nov. 1973.
Richard K. Martin et al.: "A Blind Adaptive TEQ for Multicarrier Systems", IEEE Signal Processing Letters, vol. 9, No. 11, Nov. 2002.
G. Arslan et al.: "Equalization for Discrete Multitone Transceivers to Maximize Bit Rate", IEEE Transaction on Signal Processing, vol. 40, No. 12, Dec. 2001.
S.I. Husain et al.: "Modified Channel Shortening Receiver Based on MSSR Algorithm for UWB Channels", Electronics Letters, vol. 43 No. 9, Apr. 26, 2007.

* cited by examiner

METHOD FOR REDUCING CHANNEL LENGTH AND CORRESPONDING FILTER AND SIGNAL

CROSS-REFERENCE TO RELATED APPLICATIONS

This Application is a Section 371 National Stage Application of International Application No. PCT/EP2010/070712, filed Dec. 23, 2010, which is incorporated by reference in its entirety and published as WO 2011/091928 on Aug. 4, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of digital communications. More precisely, the disclosure concerns the reduction of communication channel lengths.

The term "communication channel length reduction" means here the reduction in the length of an equivalent channel corresponding to a processing applied to the initial channel.

The disclosure can in particular apply to digital communications in single-carrier systems or in multi-carrier (MC) systems of the OFDM type ("Orthogonal Frequency Division Multiplex") or DMT type ("Digital Multi-Tone", the principle of which is to divide the available bandwidth into a large number of distinct sub-bands and to place the digital signal on analog carriers).

BACKGROUND OF THE DISCLOSURE

It is known that, when the pulse response of communication channels is greater than the symbol duration, or when there are multiple paths, an interference between the symbols (IBS) appears.

Currently, in order to limit the degradations of the performances in multi-carrier transmission, equalisation or pre-equalisation techniques are used.

In the alternative case of multi-carrier modulations, the use of a guard interval of sufficient size makes it possible to absorb this interference and therefore to cancel out the effects thereof. Nevertheless, when the pulse response of the channel is very long, the guard interval may adopt a large size then substantially reducing the spectral efficiency of the system.

Moreover, in some systems, the actual spreading of the delays exceeds the size of the guard interval, thus considerably impairing the performance.

In order to reduce the spread of the channel delays in single-carrier systems, or in the case of multi-carrier systems to reduce the guard interval or to ensure that the pulse response is contained therein, several channel length reduction techniques have been developed and applied to the structural definition of a channel length reduction filter of the pulse response of the channel.

For example, in the document "*Adaptive channel memory truncation for maximum likelihood sequence estimation*" (D. Falconer and F. R. Magee, Bell System Technical Journal, vol. 52, no. 9, pp. 1541-1562, 1973) a channel length reduction method using a minimum mean square error (MMES) algorithm is proposed for reducing the channel size. More precisely, according to this technique, the coefficients of a channel length reduction filter are obtained by the conventional application of the mean square error (MSE) minimisation criterion.

Alternatively, the document "Impulse response shortening for discrete multitone tranceivers", (J. W. Melsa, R. C. Younce and C. E. Rohrs, IEEE Trans. Communications, vol. 44, no. 12, pp. 1662-1672, 1996) proposes an MSSNR ("Maximum Shortening Signal to Noise Ratio") method for minimising the energy outside the guard interval or maximising the energy contained in the guard interval. More precisely, this technique models the channel in two parts, one referred to as useful "$h_{max}$" as illustrated (11) in FIG. 1 and another part to be minimised "$h_{min}$" (12) using a w filter.

Figure 1:
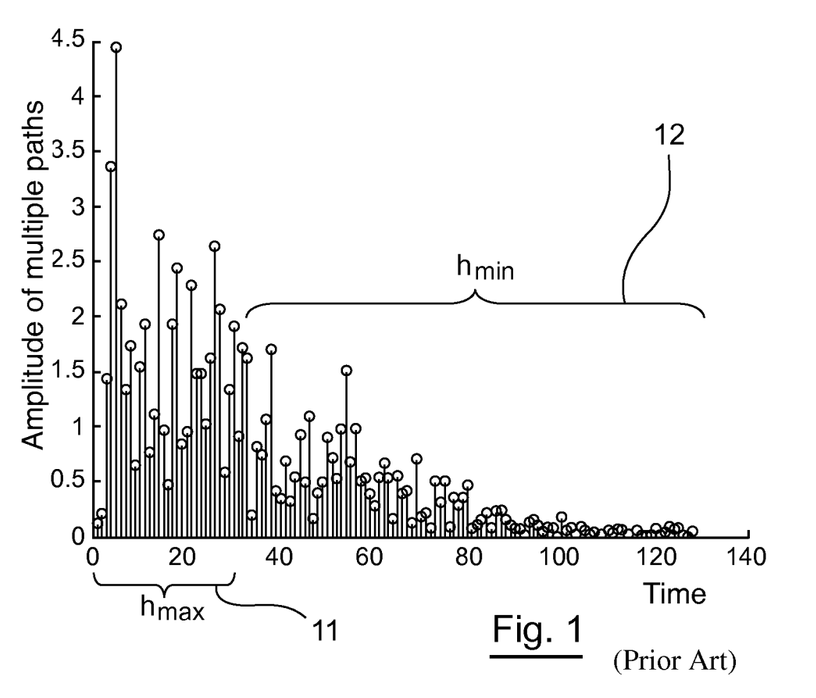
FIG. 1, discussed in the preamble, illustrates the pulse response of a channel, for example an ultra wide band channel, without channel length reduction processing.

Conventionally, the equivalent channel is represented by the following equation:

$$h_{eq} = h*w = (h_{max} + h_{min})*w$$

According to this method, the coefficients of the filter are obtained by maximising the energy ratio between $h_{max}$ and $h_{min}$ using a single optimisation criterion.

In the document "*Impulse Response Shortening through Limited Time Reversed Channel in MB OFDM UWB Systems*", (S. I. Husain, J. Yuan and J. Zhang, ISCIT 2007, pp. 1269-1273, October 2007), the channel length reduction filter effects a time reversal limited to the $h_{min}$ part.

Moreover, the combination of two distinct filters is also known from the prior art. For example, one of the filters concentrates the energy and the other acts on the result of the convolution between the channel and the concentration filter in order to make the channel as close as possible to an ideal pulse response.

Other techniques have been developed as variants of these techniques, in particular, the min-ISI technique can be cited, developed in the document "*Equalization for discrete multitone receivers to maximize bit rate*" (Arslan, B. L. Evans, and S. Kiaei, IEEE Trans. Signal Processing, vol. 49, no. 12, pp. 3123-3135, 2001), which aims to be free of the interferences in the frequency domain and consists in generalising the MSSNR technique previously described.

The inventors have found that these techniques are however limited by two major drawbacks: firstly the complexity of the calculations of the coefficients of the reduction filter or filters and secondly the fact that these techniques do not prove to be sufficiently effective on certain types of channel, such as ultra wide band channels.

SUMMARY

An exemplary embodiment of the invention proposes a novel solution that does not have all the drawbacks of the prior art, in the form of a method for reducing channel length using a channel length reduction filter taking account of a channel pulse response.

According to an embodiment of the invention, such a method comprises the following steps:
 dividing the filter into at least first and second parts;
 optimising the first part of the filter according to a first criterion, delivering a first set of filtering coefficients;
 reducing the length of the channel by optimising the second part of the filter according to a second criterion, distinct from the first criterion, and according to the first set of filtering coefficients of the first part of the filter delivering a second set of filtering coefficients.

Moreover, this method is followed by a step of applying the channel length reduction filter previously obtained to the channel.

Thus, an embodiment of the invention is based on a novel and inventive approach and makes it possible, after application of the channel length reduction filter to the channel, to optimise the concentration of the energy in the useful part of the channel $h_{max}$ while reducing the complexity of design of the channel length reduction filter. Indeed the succession of steps of the method according to an embodiment of the invention and the use of two distinct criteria permits to simply optimise the obtaining of the coefficients of the two parts of the filter. The conjoint use of these two parts of the filter then makes it possible to act simultaneously on the two parts $h_{max}$ and $h_{min}$ (with reference to FIG. 1 of the prior art).

This approach runs counter to the preconceptions of a person skilled in the art. It is indeed not obvious that the use of two distinct criteria making it possible to obtain at least two sets of filtering coefficients of the same filter, the second set depending on the coefficients of the first set, makes it possible to reduce the complexity of design of this filter while obtaining good performance.

As it will be seen subsequently, the result indeed of this technique is better efficacy of design of the filter in particular in terms of minimisation of the bit error rate.

Moreover, several optimisation techniques can be used for optimising the first part of the filter. It is in particular possible to choose to initialise the first set of filtering coefficients in particular by using a representation in the form of a dirac. It is also possible to use the properties of discrete cosine transformation (DCT) in order to concentrate the energy in the useful part of the equivalent channel.

In addition, an embodiment of the invention is effective for all types of communication channel and in particular ultra wide band channels.

According to a particular feature, the first criterion is obtained by determining a first length $L_{max}$, corresponding to a first number $L_{max}$ of coefficients of a first part of an equivalent channel, the equivalent channel being obtained by applying said filter to the pulse response of the channel.

The equivalent channel is in particular represented by the following equation:

$$h_{eq} = h * w = (h_{max} + h_{min}) * w = h_{eqmax} + h_{eqmin}$$

Determining this first length $L_{max}$ therefore makes it possible to act on the complexity of the system and the performance thereof. Indeed $L_{max}$ corresponds to the number of equivalent channel coefficients on which the energy is concentrated in the so-called useful part $h_{eq\_max}$ of the equivalent channel. This determination may correspond to a choice of a fixed value of $L_{max}$ made by the designer of the filter in order to obtain a given performance level, or may be chosen so as to be less than or equal to the length of a guard interval or to a value defined according to the nature of the used communication channel.

Advantageously, obtaining the first criterion also uses the determination of a maximum power of said first part of the equivalent channel.

Thus, applying the first criterion according to an embodiment of the invention aims to concentrate the maximum energy of the signal in the so-called useful part $h_{eq\_max}$ of the equivalent channel.

According to a particular aspect of an embodiment of the invention, the second criterion comprises the determination of a second length Lx according to said first length $L_{max}$.

For example, said second length Lx is equal to the channel length added to the channel length reduction filter length reduced by said first length plus one. In this case, the length Lx can be represented by the following equation: $Lx = L_{min} + L_w - 1$ where $L_{min} = L_h - L_{max}$, with $L_h$ the channel length and $L_w$ the length of the filter.

Advantageously, obtaining said second criterion also uses the determination of a minimum power of a second part of said equivalent channel.

Thus the application of the second criterion according to an embodiment of the invention aims to minimise the energy of the signal contained in the "tail" $h_{eq\_min}$ of the equivalent channel.

Preferentially, the maximum power of said first part of the equivalent channel is greater than or equal to the power of the first $L_{max}$ coefficients of the pulse response of the channel.

Advantageously, the minimum power of said second part of said equivalent channel is also less than or equal to the power of the remaining coefficients of the pulse response.

Indeed, thanks to this particular aspect of an embodiment of the invention, the energy contained in the tail of the equivalent channel is minimised, that is to say in the part $h_{eq\_min}$ with respect to the power contained in the part $h_{min}$ of the original channel, that is to say for the remaining $L_h - L_{max} = L_{min}$ coefficients.

Thanks to these constraints on the first and second criteria, the result is indeed a "reduction" in the useful equivalent channel length, that is to say where the majority of the channel energy is concentrated. Indeed this concentration of the energy results in increasing the power contained in the part $h_{eq\_max}$ of the equivalent channel with respect to the power contained in the useful part $h_{max}$ of the original channel.

According to another advantageous aspect of an embodiment of the invention, the first length $L_{max}$ is variable. Thanks to this aspect, it is therefore possible to adjust the complexity of calculation of the filter coefficients. Moreover, it is thus also possible to adapt the method according to the desired performance or according to the aimed communication channel.

One embodiment of the invention is characterised in that said reduction step is iterated at least once.

Thus it is possible to improve, at each iteration, the determination of the second set of filtering coefficients, which makes it possible to improve the reduction in the length of the equivalent channel. This recursiveness can also be used systematically until a predetermined threshold of channel length reduction is reached, or it can also be used at each variation in the pulse response of the channel.

An embodiment of the invention also concerns a filter for reducing channel length taking account of a channel pulse response, comprising:
  means for dividing the filter into at least first and second parts;
  means for optimising said first part of the filter according to a first criterion, delivering a first set of filtering coefficients;
  means for reducing the length of the channel comprising means for optimising said second part of the filter according to a second criterion, distinct from the first criterion, and according to the first set of filtering coefficients of the first part of the filter delivering a second set of filtering coefficients.

Such a filter is in particular obtained by the method described previously. In addition, this filter can be used on transmission or reception.

An embodiment of invention also concerns a channel length reduction system taking account of a channel pulse response, comprising at least:
- a transmission filter comprising means of optimising the transmission filter according to a first criterion, delivering a first set of filtering coefficients;
- a reception filter comprising means of reducing the channel length comprising means of optimising the reception filter according to a second criterion, distinct from said first criterion, and according to said first set of filtering coefficients of said first transmission filter delivering a second set of filtering coefficients.

In addition, an embodiment of the invention also concerns a data signal, used by the channel length reduction system previously described, comprising the first set of filtering coefficients obtained for a transmission filter previously described.

BRIEF DESCRIPTION OF THE DRAWINGS

Other features and advantages will emerge more clearly from a reading of the following description of a particular embodiment given by way of simple illustrative and non-limitative example, and the accompanying drawings, among which.

DETAILED DESCRIPTION OF ILLUSTRATIVE EMBODIMENTS

1. General Principle

The general principle of an embodiment of the invention is based on the decomposition of the coefficients of a channel length reduction filter as well as the coefficients of the pulse response of the channel in two parts, one useful where the energy of the channel is concentrated and the other where the energy of the channel is minimised. Thanks to this division, the coefficients w of the filter are determined in order to obtain equivalent channel coefficients (the equivalent channel being obtained by applying the filter to the pulse response of the channel) optimised according to two distinct criteria. This channel length reduction technique thus makes it possible to limit the degradation related to the appearance of interference between symbols when the pulse response of the communication channels is greater than the symbol time or the guard interval.

2. Description of an Embodiment

Figure 2:
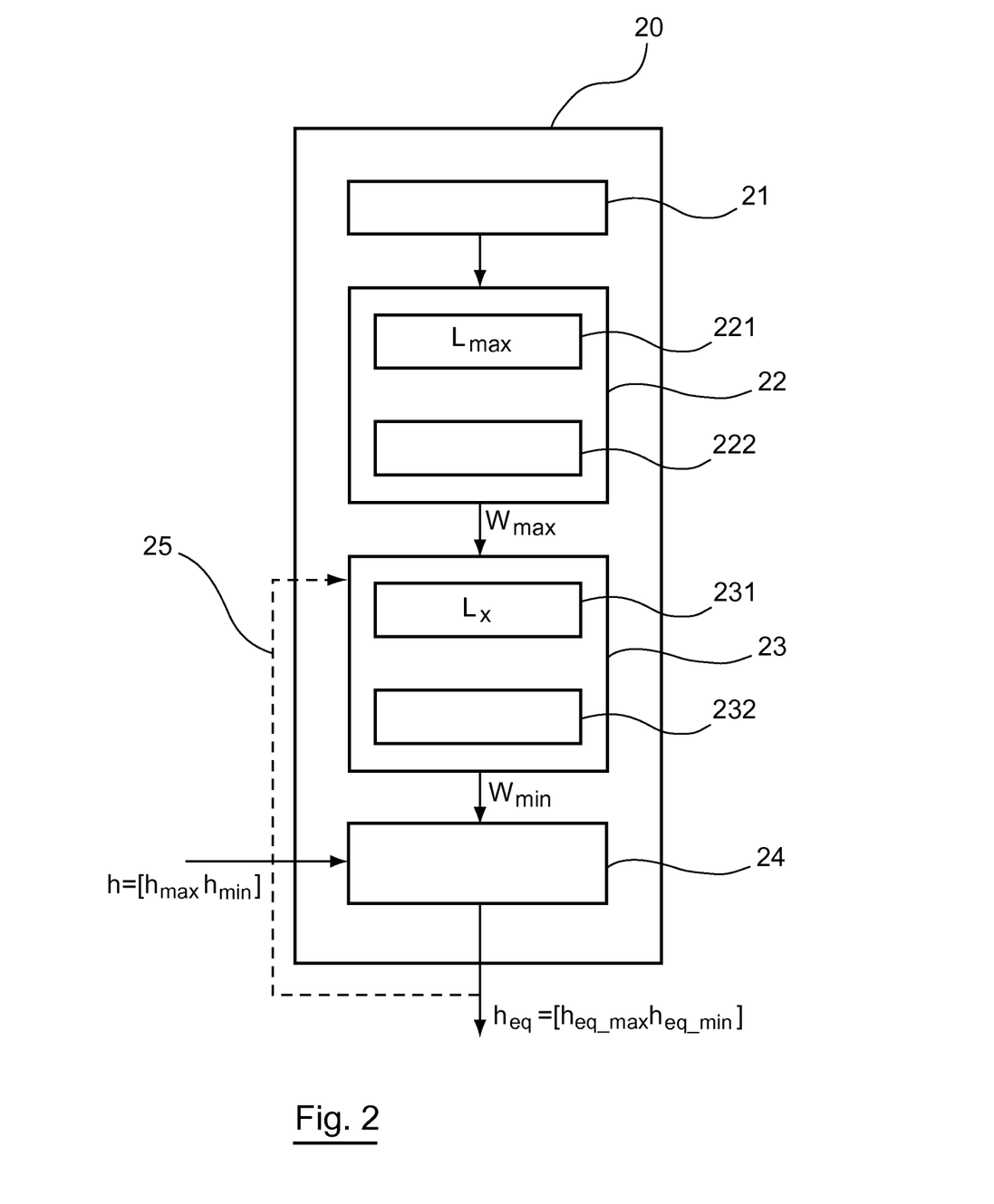
FIG. 2 illustrates the main steps of the method at transmission.

In relation to FIG. 2, the main steps of the method (20) according to a first embodiment of the invention used at transmission are presented in a multi-carrier context.

This description of a particular embodiment can also be transposed to the single-carrier case.

First, a decomposition of the coefficients of the pulse response into two parts: $h=[h_{max}\ h_{min}]$ is considered.

In addition, according to a first step of the method according to an embodiment of the invention, the division 21 of the channel length reduction filter into first and second parts is implemented:

$$w=[w_{max} w_{min}]$$

The combined effect of the channel length reduction filter and the channel is written from the filtering operation, that is to say the convolution product, as follows:

$$h_{eq}=w*h \text{ or } h_{eq}=h*w$$

depending on whether the channel length reduction is applied respectively to transmission or reception, with $h_{eq}$ being a vector representing the equivalent channel of size $L_w+L_h-1$ where $L_h$ is the channel length and $L_w$ the length of the filter.

In the same way as before, the equivalent channel is modelled in two parts:

$$h_{eq}=[h_{eq\_max} h_{eq\_min}]$$

The embodiment described below is applied to the transmission, but can be applied in a similar manner to reception.

The following step consists in achieving the optimisation (22) of the first part of the filter, according to a first criterion, delivering a first set of filtering coefficients called $w_{max}$ coefficients (from the $w_{max}$ part of the filter).

This optimisation step (22) implements, for example, two substeps that consist respectively of determining (221) the length $L_{max}$ of the first part of the filter, that is to say the number of coefficients of the first part of the filter, and in addition determining (222) the maximum power of the equivalent channel, the equivalent channel being obtained by applying the filter to the pulse response of the channel. These two variables, namely the length $L_{max}$ and the maximum power $P_{max}$, define the constraints that must be satisfied by the first set of filtering coefficients.

It should be noted that determining the maximum power of the equivalent channel is optional; however, this substep makes it possible in the end to improve the performance of the method, in particular if it is imposed for example that the maximum power of the first part of the equivalent channel is greater than or equal to the power of the first $L_{max}$ coefficients of the pulse response of the channel, that is to say the coefficients of the part $h_{max}$ in relation to FIG. 1.

In this particular embodiment, a first criterion consisting of two variables is therefore obtained at the end of these two substeps. This criterion can be represented by the following notation $C1(L_{max}, P_{max})$. Application of this criterion makes it possible to determine the coefficients of the first part of the filter.

The choice of $L_{max}$ makes it possible to act on the complexity of the system and its performances. Indeed $L_{max}$ also corresponds to the number of equivalent channel coefficients on which the energy is concentrated in the so-called useful part $h_{eq\_max}$ of the equivalent channel. The choice of $L_{max}$ can correspond to a fixed value of $L_{max}$ selected by the designer of the filter in order to obtain a given performance level, or may correspond to the length of the guard interval or to a value defined according to the nature of the used communication channel.

The filter designer is free to choose the coefficients $w_{max}$ and the size $L_{max}$ according to the performances of the system that he wishes to achieve (reducing the size of the cyclic prefix, reducing the complexity, increasing the power, etc.).

Optionally, it is possible for example to consider by default an initialisation of the coefficients $w_{max}$ by a dirac:

$$w_{max}(i) = \delta_{0,i}$$

Preferentially, it is also possible to use the property of concentration of energy of the discrete cosine transformation (DCT) in order to define the coefficients $w_{max}$:

$$w_{max}(i) = \begin{cases} \sqrt{\frac{1}{L_{max}}} \cos\left[\frac{\Pi(2i+1)}{2L_{max}}\right], & 0 < i \leq L_{max} \\ \sqrt{\frac{2}{L_{max}}}, & i = 0 \end{cases}$$

Once the coefficients $w_{max}$ have been obtained by complying with the criterion C1, according to the method of an embodiment of the invention, the step of reducing the channel length (23) is performed, by optimisation of the second part of the filter according to a second criterion denoted C2 distinct from the first criterion C1, and according to said first set of filtering coefficients $w_{max}$ of the first part of the filter delivering a second set of filtering coefficients referred to as $w_{min}$ coefficients (of the part $w_{min}$ of the filter).

This step of channel length reduction by optimisation (23) uses for example two substeps that consist respectively in deducing (231) according to $L_{max}$, the length $L_x$ of the second part of the filter, and moreover determining (232) the minimum power of the equivalent channel. These two variables, namely the length $L_x$ and the minimum power denoted $P_{min}$ correspond to the variables of the second criterion denoted C2 ($L_{min}$, $P_{min}$).

It can be noted that the length $L_x$ of the previous step can be deduced in particular by applying the following equation: $L_x = L_{min} + L_w - 1$ where $L_{min} = L_h - L_{max}$, with $L_h$ the channel length and $L_w$ the length of the filter with $L_w \geq L_{max}$.

The coefficients $w_{max}$ being fixed at the previous step, the coefficients $w_{min}$ are determined so that for example the power variable $P_{min}$ of the criterion C2 is less than or equal to the power of the remaining coefficients, that is to say the $L_{min}$ coefficients of the pulse response.

By applying this new constraint according to the criterion C2 and knowing the coefficients $w_{max}$ previously obtained, a system of equations delivering the coefficients $w_{min}$ is obtained.

It can be noted that the designer of the filter may define other criteria according to the performance that he aims at.

Figure 3:
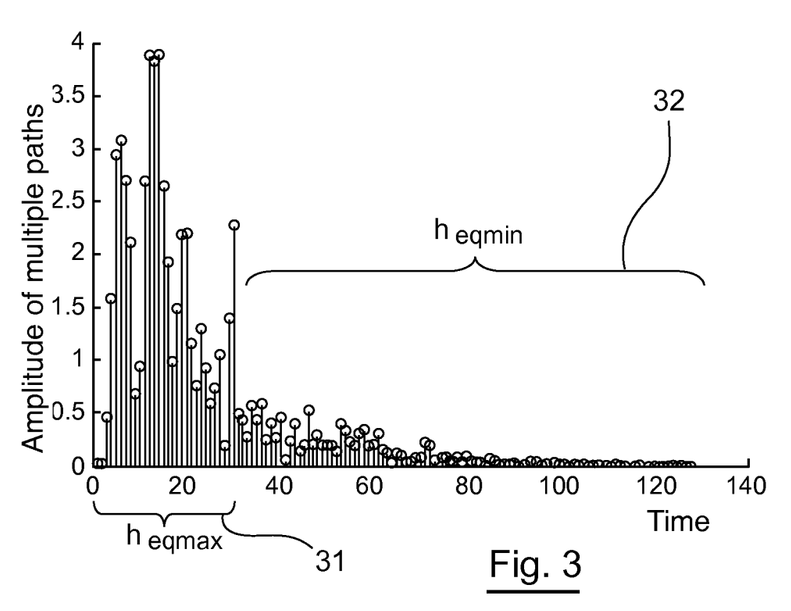
FIG. 3 illustrates the effect of the method and represents the pulse response of the equivalent channel, for example an ultra wide band channel, obtained after channel length reduction processing.

Once the set of coefficients $w = [w_{max} \ w_{min}]$ of the filter has been obtained, it is applied to the pulse response of the channel and the equivalent channel represented in relation to FIG. 3 is obtained.

It is thus noted that, by comparison with FIG. 1, the power contained in the part 31 $h_{eq\_max}$ of the equivalent channel obtained after channel reduction processing is greater than the one contained in the part $h_{max}$ of the original channel. Moreover, the power contained in the part 32 $h_{eq\_min}$ of the equivalent channel obtained after channel reduction processing is appreciably less than that contained in the part 12 $h_{min}$ of the original channel.

Thus, the channel length reduction processing performed by the filter leads to a concentration of the energy in the useful channel part and to a minimisation of the energy in the channel tail.

All the steps previously described constitute a first iteration of the method according to an embodiment of the invention which, in this particular embodiment, can reiterate (25) the channel length reduction step in order to recalculate the coefficients $w_{min}$ obtained at the previous iteration.

This recursiveness may be used systematically until a predetermined channel length reduction threshold is reached, or it may also be used at each variation in the pulse response of the channel.

Moreover, the iterative character of the method makes it possible, at each iteration, to improve the determination of the second set of filtering coefficients, which makes it possible to improve the reduction in the length of the equivalent channel.

3. Matrix Representation of an Embodiment of the Method According to the Invention In relation to FIG. 4, the matrix $M_{int}$ is introduced for calculating the coefficients $w_{min}$ and $w_{max}$, while complying with the criteria C1 and C2 obtained previously.

Figure 4:
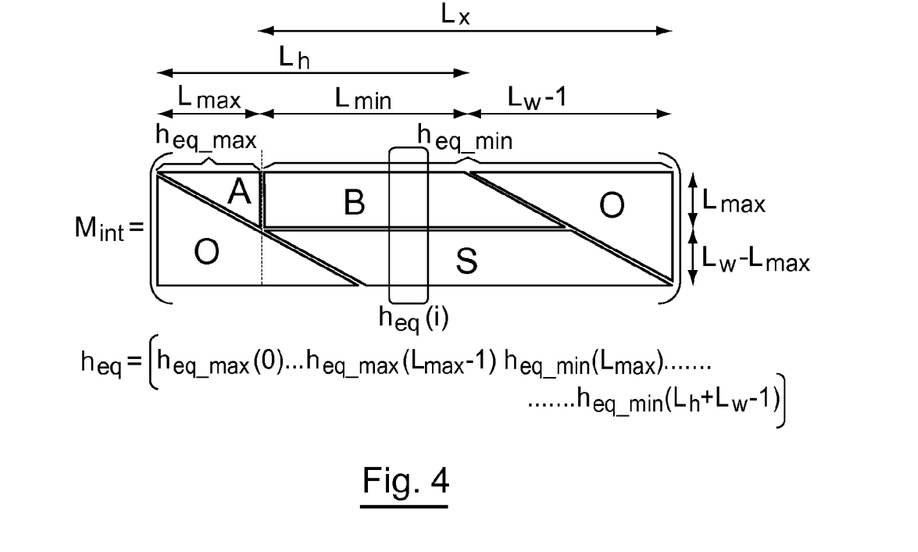
FIG. 4 is a matrix representation of the convolution operation resulting in the equivalent channel obtained according to the method of an embodiment of the invention.

This matrix $M_{int}$, referred to as the intermediate convolution matrix, is obtained by decomposing the convolution operation between the filter w and the pulse response h. Indeed it will be recalled that the combined effect of the channel length reduction filter and the channel is written from the filtering operation, that is to say the convolution product, as follows:

$$h_{eq} = w * h \text{ or } h_{eq} = h * w$$

depending on whether the channel length reduction is applied respectively to transmission or reception, with $h_{eq}$ a vector representing the equivalent channel of size $L_w + L_h - 1$ where $L_h$ is the channel length and $L_w$ the length of the filter.

According to an embodiment of the invention, this matrix is divided into three particular sub-matrices:

the matrix A, which is triangular and superior, and the elements of which are dependent only on $h_{max}$, the first part containing the first $L_{max}$ coefficients of the pulse response of the channel before channel length reduction processing and $w_{max}$, that is to say the first $L_{max}$ coefficients of the first part of the filter;

the matrix S, the elements of which are dependent only on $w_{min}$ and h, the pulse response of the channel;

the matrix B, the elements of which are dependent only on $w_{max}$ and h.

The position of the threshold represented by the vertical bar separating the matrix A and the matrix B is defined by the value of $L_{max}$ and it may be if necessary adjusted by the designer of the channel length reduction filter. As illustrated in FIG. 4, the length $L_{max}$ thus determines the size of the various matrices A, S and B.

Moreover, the coefficients of the equivalent channel $h_{eq} = [h_{eq\_max} \ h_{eq\_min}]$ are the result of the adding of the elements of the intermediate matrix $M_{int}$ column by column. Thus, meeting the criteria C1 and C2 stated previously amounts to stating that:

the size of $h_{eq\_max}$ is directly obtained by the choice of the size of $w_{max}$ and corresponds therefore to the length $L_{max}$;

maximisation of the energy according to the first criterion C1 contained in $h_{eq\_max}$ depends solely on the choice of $w_{max}$;

minimisation of the energy of $h_{eq\_min}$ according to the second criterion C2 depends on the combination of the matrices B and S, and therefore on the choice of $w_{min}$, assuming $w_{max}$ to be fixed previously.

Thus, in our application, the matrix S is calculated so as to seek to cancel out (or minimise) $h_{eq\_min}$. For this purpose, the vector resulting from the convolution of h and $w_{min}$ is called the vector $s_{vect}$, that is to say the vector calculated by the adding of the coefficients of the columns of S.

Likewise, the vector calculated from the adding of the coefficients of the columns of the matrix B is called $b_{vect}$.

For a representation of the calculations in a matrix form, the size of this vector $b_{vect}$ can be extended by zeros so that $s_{vect}$ and $b_{vect}$ have the same dimension.

Moreover, in order to minimise $h_{eq\_min}$, the criterion C2 is applied in the following form:

the sum $s_{vect} + b_{vect} = 0_{vect}$ or approaches the zero vector.

To determine the coefficients of $w_{min}$, the following system is then solved:

$$w_{min} * h = S_{vect} = -b_{vect}$$

which gives, in the frequency domain:

$$W_{min} H = S_{vect} = -B_{vect}$$

In addition, the inventors thought of imposing certain values of $b_{vect}$. More particularly, according to the aimed objective, the inventors propose to ix in advance certain values of $b_{vect}$ at 0, which reduces the complexity of the matrix calculations and makes it possible to obtain better performance.

Thus there are $L_w + L_{min} - 1$ equations for $L_w - L_{max}$ unknowns, with:

$$A = \begin{pmatrix} w_{max}(0)h(0) & w_{max}(0)h(1) & \cdots & w_{max}(0)h(L_{max}-1) \\ & w_{max}(1)h(0) & \cdots & w_{max}(0)h(L_{max}-2) \\ & & \ddots & \cdots \\ & & & w_{max}(L_{max}-1)h(0) \end{pmatrix}$$

$$B = \begin{pmatrix} w_{max}(0)h(L_{max}) & w_{max}(0)h(L_{max}+1) & \ldots & w_{max}(0)h(L_h-1) & & \\ w_{max}(1)h(L_{max}-1) & w_{max}(1)h(L_{max}) & \ldots & w_{max}(1)h(L_h-2) & \ldots & w_{max}(1)h(L_h-1) \\ \vdots & \vdots & \vdots & & \ddots & \\ w_{max}(L_{max}-1)h(1) & w_{max}(L_{max}-1)h(2) & \ldots & \ldots & \ldots & w_{max}(L_{max}-1)h(L_h-1) \end{pmatrix}$$

$$S = \begin{pmatrix} w(L_{max})h(0) & w(L_{max})h(1) & \ldots & w(L_{max})h(L_n-1) & & \\ & w(L_{max}+1)h(0) & w(L_{max}+1)h(1) & \ldots & w(L_{max}+1)h(L_h-1) & \\ & \ddots & \ddots & \ddots & & \ddots \\ & & w(L_w-1)h(0) & w(L_w-1)h(1) & & w(L_w-1)h(L_h-1) \end{pmatrix}$$

or also $$s = \begin{pmatrix} w_{min}(0)h(0) & w_{min}(0)h(1) & \ldots & w_{min}(0)h(L_h-1) & & \\ & w_{min}(1)h(0) & w_{min}(1)h(1) & \ldots & w_{min}(1)h(L_h-1) & \\ & \ddots & \ddots & \ddots & & \ddots \\ & & w_{min}(L_w-L_{max}-1)h(0) & w_{min}(L_w-L_{max}-1)h(1) & & w_{min}(L_w-L_{max}-1)h(L_h-1) \end{pmatrix}$$

Thus, according to this matrix representation $M_{int}$, referred to as intermediate convolution matrix, obtained by decomposing the convolution operation between the filter w and the pulse response h, the steps of the method according to an embodiment of the invention can be represented in matrix form.

Indeed, after division of the filter into at least first and second parts, the optimisation of the first part of the filter is performed according to the first criterion C1, delivering a first set of filtering coefficients.

In the matrix representation according to FIG. 4, this step amounts to choosing $L_{max}$, which determines the size of the matrices A and B, and then $L_{max}$ is used to determine $L_x$ assuming the number of columns in the matrix S.

In addition, the choice of the coefficients $w_{max}$ by application of the adopted criterion C1 makes it possible to determine the values of the matrix A.

Once the matrix A is obtained, the step of reducing the length of the channel by optimisation of the second part of the filter according to the second criterion C2 is performed, distinct from said first criterion C1, and according to the first set of filtering coefficients $w_{max}$ of the first part of the filter. In this way, the values of B are deduced.

Then the coefficients $w_{min}$ are determined by application of the criterion C2 aimed at minimising or even cancelling out the "tail" $h_{eq\_min}$ of the pulse response of the equivalent channel in particular by applying the equation $$w_{min} = -\frac{B_{veet}}{H}$$

in the frequency domain where the division is performed element by element, that is to say without matrix inversion.

In practice, according to an embodiment of the invention, the size of the Fourier transform is free but at least equal to $L_w - L_{max}$.

In addition, it may be noted that there exists various ways of calculating $w_{min}$: directly or by algorithms, in the time or frequency domain.

Thus, unlike the techniques of the prior art, which apply for a filter a single global criterion on A and B, the method according to an embodiment of the invention takes advantage of the use of the criteria C1 and C2, the criterion C2 being distinct and dependent on the criterion C1.

Application of the filter containing the coefficients $w_{min}$ and $w_{max}$ to the pulse response leads to the obtaining of an equivalent channel $h_{eq} = w*h$ with a reduced channel length, that is to say having a maximum amount of energy in its useful part.

Several methods also make it possible to determine $w_{min}$ such as the minimum mean square error for example.

Figure 5:
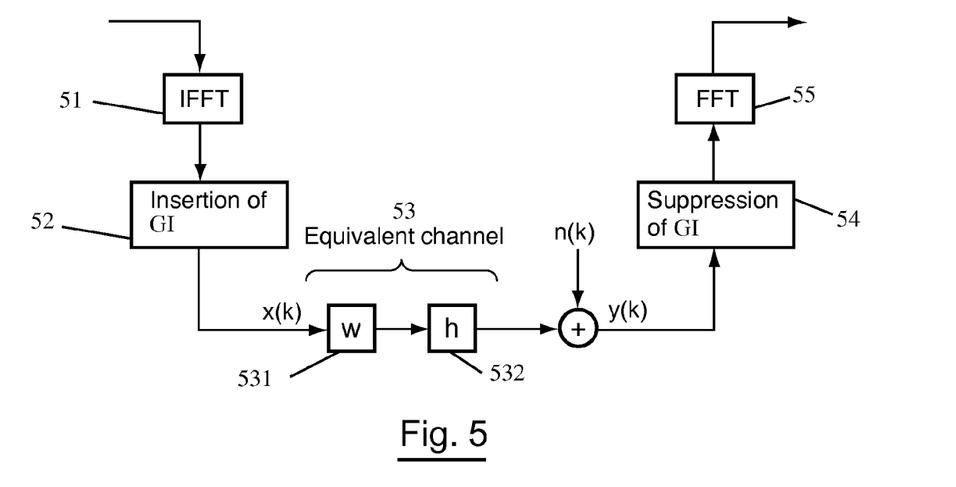
FIGS. 5, 6, 7 show respectively a system implementing the method according to an embodiment of the invention at transmission, at reception and in a shared manner, some of the method being implemented at transmission and the complementary part being implemented at reception.

4. Various Types of Device Implementing the Method According to an Embodiment of the Invention As mentioned previously, the method according to an embodiment of the invention is used at transmission as illustrated in FIG. 5.

According to this figure, at transmission the signal to be transmitted is first of all processed by an inverse Fourier transform module (IFFT) 51, and then by a module 52 for inserting a guard interval GI and then by a filter 531 optimised according to an embodiment of the invention, that is to say decomposed into two parts $w_{max}$ and $w_{min}$.

Once this signal has been filtered, it is sent into the channel 532. It is considered that the equivalent channel 53 is obtained by application of the filter to the pulse response. Application of the filter according to an embodiment of the invention to the pulse response makes it possible, thanks to the coefficients $w_{max}$, to concentrate the energy in the first part of the equivalent channel and the coefficients $w_{min}$ make it possible to minimise the energy contained in the "tail".

On reception, a signal transmitted through the noisy equivalent channel (n(k)) is received, and this signal is processed by passing through a module 54 for suppressing the guard interval GI, and then through a module 55 performing a Fourier transform (FFT).

Figure 6:
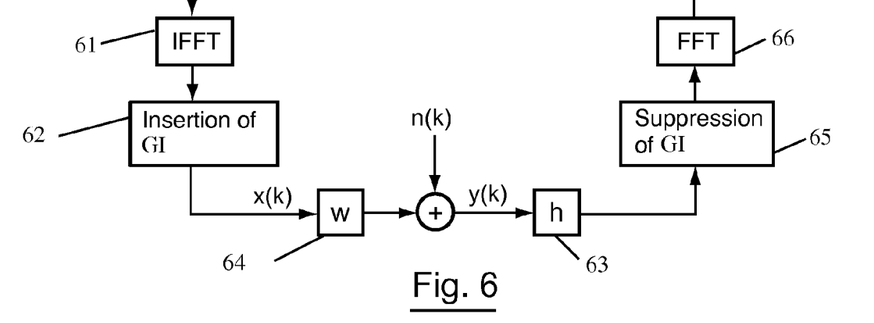

In addition, the method according to an embodiment of the invention can also be used at reception as described in relation to FIG. 6. Just as in FIG. 5, at the transmission, the signal to be transmitted is first of all processed by an inverse Fourier transform (IFFY) module 61, and then by a module 62 for inserting a guard interval GI.

The signal is sent into the channel h 63. At reception, a noisy signal is received, and the filter 64 designed according to an embodiment of the invention is applied. The filter used in reception combined with the pulse response of the channel makes it possible to obtain an optimum equivalent channel and thus makes it possible to obtain good reception performance.

Then, conventionally, this signal outputted from the reception filtering is processed by passing through a module 65 for suppressing the guard interval GI and then through a module 66 performing a Fourier transform (FFT).

Figure 7:
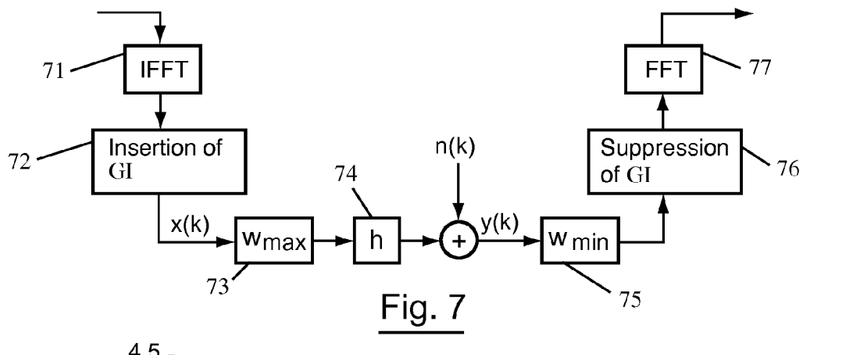
Figure 8:
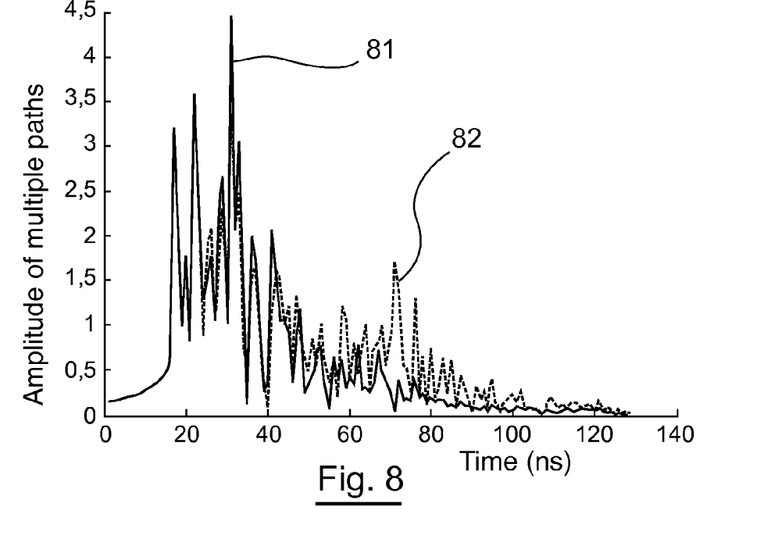
FIG. 8 compares the pulse response with and without the channel length reduction processing applied to a communication on a CM4 ultra wide band channel (IEEE 80.2.15.3a)

FIG. 7 for its part illustrates a system implementing the method according to an embodiment of the invention shared between reception and transmission.

Thus, just as for the previous variants, the signal to be transmitted is first of all processed by an inverse Fourier transform (IFFT) module 71, and then by a module 72 for inserting a guard interval GI.

Then a first transmission filter 73 composed of the coefficients $w_{max}$. The signal is sent into the channel h 74. At reception, a noisy signal is received, and the so-called reception filter 75, composed of the coefficients $w_{min}$ obtained according to the method of an embodiment of the invention is applied. The filter used in reception combined with the pulse response of the channel and the action of the transmission filter also makes it possible to obtain an optimum equivalent channel and thus makes it possible to obtain good reception performance.

Then, conventionally, this signal outputted from the reception filter in is processed by passing through a module 76 for suppressing the guard interval GI and then through a module 77 performing a Fourier transform (FFT).

5. Performances of the Method According to an Embodiment of the Invention 5.1 Reduction of the Complexity of Channel Length Reduction Processing Complexity means the number of operations performed for obtaining an optimum equivalent channel. The complexity of the technique is calculated as following, from the matrix representation described previously, and depends on $L_{max}$.

For example, according to a first embodiment, if $w_{max}$ is initialised by a dirac:

calculation of $B_{vect}$ requires:
  $(L_h - L_{max})L_{max} + L_w + \sum_{i=1}^{L_{max}-1} (i) - 1$ additions.
  $(L_h - L_{max})L_{max} + \sum_{i=1}^{L_{max}-1} (i)$ multiplications.

the calculation of $w_{min}$ requires calculation of:
  two Fourier transforms with maximum complexity of order $L_h \log(L_h)$ and minimum complexity of order $L_{L_{max}+1} \log(L_{L_{max}+1})$;
  an inverse Fourier transform with a complexity of order $L_w \log(L_w)$;
  a division element by element: that is to say Lw elementary divisions.

Moreover, according to a second preferential embodiment, if $w_{max}$ is initialised by a discrete cosine transform (DCT) the property of which is to concentrate the energy:

the complexity of the discrete cosine transform is $o(L_{max} \log(L_{max}))$;

calculation of $B_{vect}$ requires:
  $(L_h - L_{max})L_{max} + L_w + \sum_{i=1}^{L_{max}-1} (i) - 1$ additions.
  $(L_h - L_{max})L_{max} + \sum_{i=1}^{L_{max}-1} (i)$ multiplications.

calculation of $w_{min}$ requires calculation of:
  two Fourier transforms with maximum complexity of order $L_h \log(L_h)$ and minimum complexity of order $L_{L_{max}+1} \log(L_{L_{max}+1})$;
  an inverse Fourier transform with a complexity of order $L_w \log(L_w)$;
  a division element by element: that is to say Lw elementary divisions.

Thus, if for example if the length of the filter $L_w=10$, and the length of the useful part of the equivalent channel is chosen at $L_{max}=3$ with $L_h=512$ the channel length, the complexity of this technique (in number of operations) is equal to 5865. If $L_{max}=5$, a complexity equal to 7897 is obtained.

The following table presents the complexity of the techniques of the prior art for channel length reduction techniques using ADSL ("Asymmetric Digital Subscriber Line"). These results in particular come from the document "*Implementation complexity and communication performance tradeoffs in discrete multitone modulation equalizers*" (R. K. Martin, K. Vanbleu, M. Ding, G. Ysebaert, M. Milosevic, B. L. Evans, M. Moonen and C. R. Johnson Jr., IEEE Trans. Signal Process., vol. 54, pp. 3216, August 2006.) and in which the necessary parameters are defined.

| Description | Complexity | Lw = 10 |
|---|---|---|
| MMSE | $(^2/_3 v^3 + L_w^2 + L_w v)N_\Delta + 2vL_w^2$ | 473972 |
| MSSNR | $^8/_3 L_w^3 N_\Delta + L_h L_w + 2L_w^2$ | 53320 |
| min-ISI | $(^8/_3 L_w^3 + 3NL_w + 5L_w^2 - 2vL_w)N_\Delta$ | 117782 |

It is therefore found that the technique according to an embodiment of the invention is appreciably less complex than the techniques of the prior art.

5.2 Minimisation of the Bit Error Rate

The method according to an embodiment of the invention also makes it possible to achieve good performance in terms of minimisation of the bit error rate. The graph in FIG. 9 is a superposition of pulse responses of the channel with (81) and without (82) processing according to the method of an embodiment of the invention, for an ultra wide band channel (UWB CM4 (IEEE 80.2.15.3a)).

It will be noted that the method according to an embodiment of the invention makes it possible to achieve the objective of channel length reduction. Indeed, from the 60th millisecond approximately, the tail of the pulse response of the equivalent channel resulting from the processing according to an embodiment of the invention is characterised by an energy that is minimised with respect to the energy contained in the corresponding part of the pulse response of the channel that has not undergone any channel length reduction processing.

Figure 9:
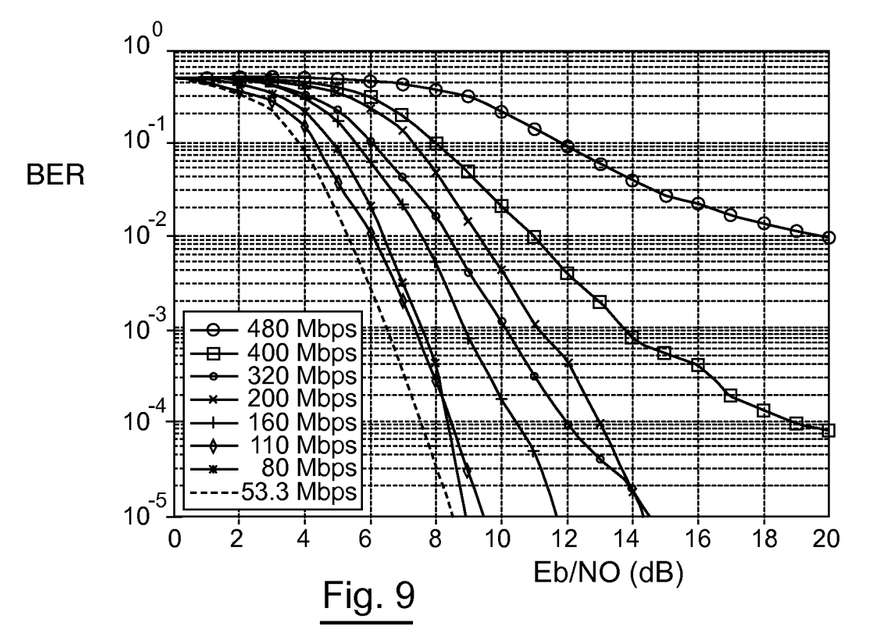
FIGS. 9 and 10 establish a comparison in terms of performances without and with a channel length reduction processing according to the method of an embodiment of the invention.
Figure 10:
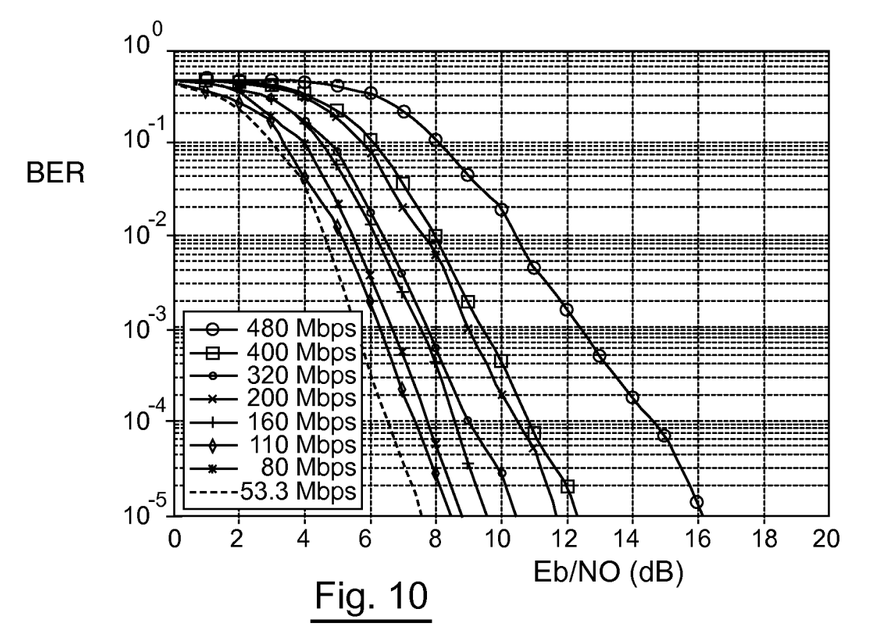

Moreover, FIGS. 9 and 10 make it possible to compare here the results of simulation of bit error rates obtained respectively without and after application of the method according to an embodiment of the invention.

It will easily be noted that the convergence and the performance obtained using the method according to an embodiment of the invention are clearly improved. Indeed a minimisation of the bit error rate (BET) is observed according to the signal to noise ratio Eb/N0. More precisely, an effective reduction in the bit error rate is observed, for any rate used, whereas, without the processing according to the method of an embodiment of the invention, high bit error rates are obtained when the rate is high.

Although the present disclosure has been described with reference to one or more examples, workers skilled in the art will recognize that changes may be made in form and detail without departing from the scope of the disclosure and/or the appended claims.

The invention claimed is:

1. A method for reducing channel length comprising:
   designing a channel length reduction filter by defining a set of coefficients of said channel length reduction filter, wherein said defining comprising:
   dividing said set of coefficients into two complementary parts of coefficients of said channel length reduction filter;
   according to a first criterion, a first optimising of one part of said two complementary parts, called a first part of coefficients, delivering a first subset of optimised values of the filtering coefficients belonging to said first part;
   according to a second criterion, distinct from said first criterion, a second optimising of the other part of said two complementary parts, called a second part of coefficients, delivering a second subset of optimised values of the filtering coefficients belonging to said second part, said second optimising implementing a computation of the optimised values of said second subset using the optimised values of said first subset delivered by said first optimizing;
   forming an optimised set of coefficients of a channel length reduction filter, said optimised set of coefficients comprising both said first and second subsets, such that the number of coefficients of said optimised set of coefficients is equal to sum of the number of coefficients of said first subset with the number of coefficients of said second subset,
   reducing the length of a channel by applying said optimised set of coefficients of said channel length reduction filter to a pulse response of said channel.

2. The method according to claim 1, wherein said first criterion is obtained by determining a first length Lmax, corresponding to a first number Lmax of coefficients of a first part of an equivalent channel, said equivalent channel being obtained by application of said filter to the pulse response of the channel.

3. The method according to claim 2, wherein the obtaining of said first criterion also uses the determination of a maximum power of said first part of said equivalent channel.

4. The method according to claim 2, wherein said second criterion is obtained by the determination of a second length Lx according to said first length Lmax.

5. The method according to claim 4, wherein the obtaining of said second criterion also uses the determination of a minimum power of a second part of said equivalent channel.

6. The method according to claim 3, wherein the maximum power of said first part of said equivalent channel is greater than or equal to the power of the first Lmax coefficients of the pulse response of the channel.

7. The method according to claim 5, wherein the minimum power of said second part of said equivalent channel is less than or equal to the power of the coefficients of the second part of the pulse response.

8. The method according to claim 2, wherein said first length Lmax is variable.

9. The method according to claim 1, wherein said reduction step is iterated at least once.

10. A filter for reducing channel length taking account of a channel pulse response, wherein the filter comprises at least first and second complementary parts;
    said first part of the filter being optimised in a first optimization according to a first criterion, delivering a first set of filtering coefficients; and
    said second part of the filter being optimised in a second optimization according to a second criterion, distinct from said first criterion, and optimised using said first set of filtering coefficients of said first part of the filter delivering a second set of filtering coefficients;
    said filter being configured to form an optimized set of coefficients comprising both the first and second set of filtering coefficients such that the number of coefficients of said optimized set is equal to the sum of the number of coefficients in the first set of filtering coefficients plus the number of coefficients in the second set of filtering coefficients, the length of the channel thereby reduced by applying said optimized set of coefficients of said channel length reduction filter to said channel pulse response.

* * * * *